United States Patent [19]

Hamaekers et al.

[11] Patent Number: 5,113,965
[45] Date of Patent: May 19, 1992

[54] ENGINE MOUNT

[75] Inventors: Arno Hamaekers, Gorxheimertal; Arnold Simuttis, Bad Kreuznach, both of Fed. Rep. of Germany

[73] Assignee: Firma Carl Freudenberg, Weinheim/Bergstr., Fed. Rep. of Germany

[21] Appl. No.: 468,678

[22] Filed: Jan. 23, 1990

[30] Foreign Application Priority Data

Mar. 1, 1989 [DE] Fed. Rep. of Germany ....... 3906373

[51] Int. Cl.⁵ .............................................. F16F 13/00
[52] U.S. Cl. .................................... 180/300; 248/636; 267/140.1 A
[58] Field of Search ...................... 267/140.1; 180/300, 180/291; 248/562, 636

[56] References Cited

U.S. PATENT DOCUMENTS 4,708,329 11/1987 Tabata et al. ................. 267/140.1 A
4,753,421 6/1988 Makibayashi et al. .......... 180/300 X

FOREIGN PATENT DOCUMENTS 2905091 8/1980 Fed. Rep. of Germany.
3831816 3/1989 Fed. Rep. of Germany ... 267/140.1 A
2936 1/1986 Japan ........................... 267/140.1 A Primary Examiner—Andres Kashnikow
Assistant Examiner—Michael Mar
Attorney, Agent, or Firm—Felfe & Lynch

[57] ABSTRACT

A hydraulically damped engine mount includes two separate working chambers 1 which are filled with liquid and are at least in a partial area bounded by a resilient wall 2 and joined by a damping opening 4. At least one of the working chamber 1 is additionally joined to a compensating chamber 3 by means of a compensating opening 5. By means of a flexible and substantially nonelastic wall 4a, the compensating chamber 3 is suited for the pressureless reception of additional liquid. The compensating opening 5 exhibits a flow resistance which is substantially greater than that of the damping opening 4.

8 Claims, 2 Drawing Sheets

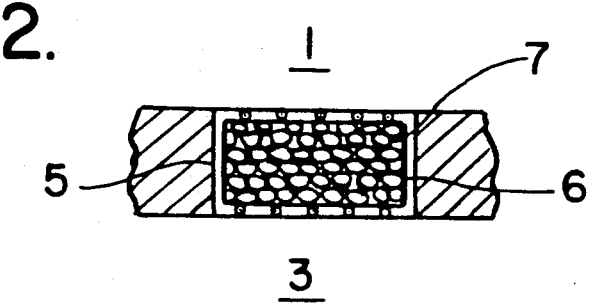
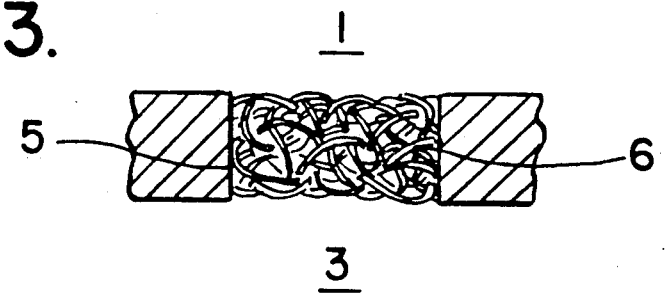
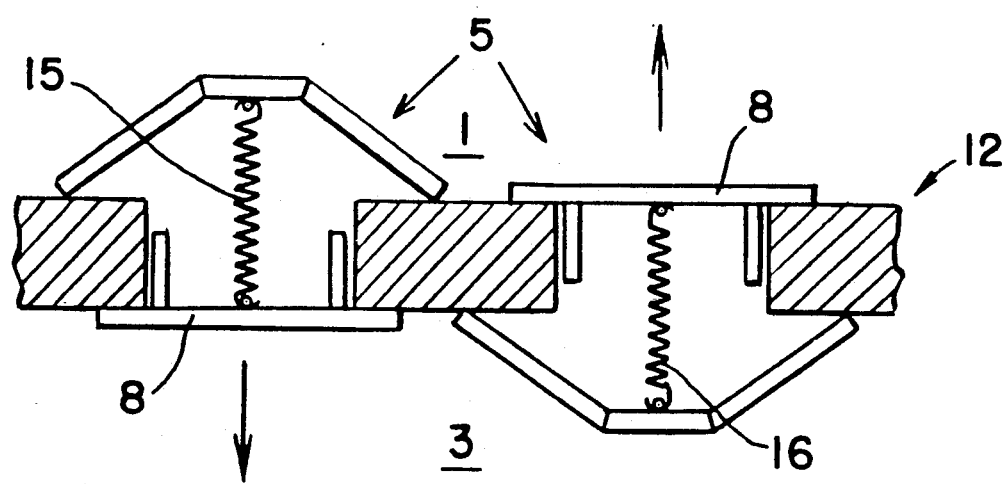

ENGINE MOUNT

The invention relates to an engine mount.

An engine mount is known from German patent PS 29 05 091. When used in engine rooms which are open toward the exterior, the aforesaid mount exhibits an excellent insulation of acoustically effective, high-frequency vibrations as well as a good damping of road-caused, low frequency vibrations. However, when used in soundproof, encapsulated engine rooms of motor vehicles, these properties are unfortunately lost.

It is hence an object of the invention to further develop an engine mount such that it exhibits a good damping of road-caused vibrations and a continuously good insulation of engine-caused, acoustically effective, high frequency vibrations when used in engine rooms of motor vehicles which are sealed so as to be soundproof toward the exterior.

In addition to the working chambers, the engine mount in accordance with the invention also has a compensating chamber; due to its flexible, essentially nonelastic wall, the compensating chamber is suited for the pressureless reception of additional liquid and joined to at least one of the working chambers via a compensating opening; the compensating opening has a flow resistance which is substantially greater than the one of the damping opening.

In this embodiment, the invention proceeds on the finding that the use of an engine mount in a soundproof engine room of a motor vehicle necessarily causes heat to develop reaching temperatures up to 140° C. The volume of the liquid contained in the working chambers hence increases significantly and, in the engine mount in accordance with the invention, this is compensated in the compensating chamber. The internal pressure on which the design of the engine mount was based is thus maintained and the insulating properties as well as the damping efficiency are not affected. Also, prestresses in the elastic defining walls of the working chamber due to the volume enlargement of the liquid caused by the temperature increase are avoided which results in an improved service life.

Due to the significant flow resistance of the compensating opening the pressure changes which are caused in the working chambers by introducing vibrations cannot cause a relative displacement of liquid components in the compensating chamber which could negatively affect the proper functioning. When designing the engine mount, the known specifications can hence be observed. The remaining components of the engine mount can also correspond to known designs. It is possible to configure the damping opening in the form of a channel or a diaphragm as well as to join parts of the walls of the working chamber via a bridge. It is also possible to use active or passive vibration decouplers.

The compensating opening can be formed by means of a capillary opening and, for example, be enclosed by a capillary tube. This, however, does by no means permit a transmission of the pressure pulses via the compensating opening.

As opposed to this, open-pore damping bodies are more robust in a mechanical respect. They can be configured as one piece or be composed of several particles which are pressed together; preferably, particles which have a sphere- or fiber-like shape. In addition to metallic and artificial materials, it is also possible to use natural materials, mineral materials, for example. The use of pressure relief valves is also possible; however, it should be noted that the necessary permeability in direction toward the compensating chamber as well as toward the appertaining working chamber must be ensured.

In accordance with the invention, a hydraulically damped engine mount comprises two separate working chambers which are filled with liquid. The mount includes a resilient wall bounding the working chambers at least in a partial area and having a damping opening joining the working chambers. The mount also includes a compensating chamber in addition to the working chambers. The mount also includes a flexible and substantially nonelastic wall for enabling the compensating chamber for the pressureless reception of additional liquid. The compensating chamber has at least one compensating opening for joining the compensating chamber to at least one working chamber and the compensating opening exhibits a flow resistance which is substantially greater than that of the damping opening.

For a better understanding of the invention, together with other and further objects thereof, reference is made to the following description, taken in connection with the accompanying drawings, and its scope will be pointed out in the appended claims.

Referring now to the drawings:

FIG. 1 is a longitudinal cross-sectional view of an example of an embodiment of the engine mount in accordance with the invention, FIGS. 2 and 3 are sectional views of two different embodiments of damping bodies to be used in the compensating opening of the engine mount in accordance with the invention, FIG. 4 is a diagrammatic view of a configuration of pressure relief valves in two independent compensating chambers of the engine mount in accordance with the invention.

The engine mount represented in FIG. 1 is a two-chamber-type mount wherein both working chambers 1 are bounded in partial areas by means of resilient walls 2. The resilient wall 2 are made of an elastomeric material, for example, rubber, and are of a hollow-conical shape. They serve to transmit forces between a first support portion 9 and second support portion 10.

The resilient walls 2 are joined by means of a metal ring 11 which at the same time serves to mechanically fix the liquid-impermeable rigid wall 12 made, for example, of metal which separates the working chambers 1. In its center area, this wall encloses a disk 13 which can be axially moved between stoppers. The disk 13 must not be deformable or must be only slightly deformable and preferably has the lightest possible weight. It preferably is made of hard rubber or a hard plastic material. The use of bonded particles of an average diameter of approximately 1 mm is also possible for manufacturing the disk. In this case, the remaining volume of the hollow space should preferably be between approximately 20 to 40%. It determines a certain flow permeability of the disk 13. This disk assumes the function of a decoupler with respect to the introduction of acoustically effective, high-frequency vibrations. The aforesaid vibrations usually have an amplitude of 0.2 mm, at a maximum. In addition, the separating wall 12 encloses a damping opening 4. The latter is formed by a simple borehole and diaphragm-like enclosed.

In the center area, the support 9 encloses an indentation which bounds the compensating chamber 3 together with a flexible and substantially nonelastic wall 4a. Wall 4a preferably is a thin film made of rubber or plastic, for example. This compensating chamber is suited for receiving additional liquid and, via the compensating opening 5, it is connected to the lower working chamber 1. The compensating opening 5 is essentially enclosed by a capillary tube 14 which has a helical form and, for the main part, is contained in the appertaining working chamber 1. It is also possible to include it in the compensating chamber 3 or in the metallic body forming the support 9.

The resilient walls 2 which bound the two working chambers are associated with one another in series. The embodiment corresponds to the one as described above. In addition, however, it is also possible to rigidly connect the wall segments of both working chambers which can be moved in the same direction and bound the working chambers, for example, by means of a bridge 9 which appears in outline. This does, of course, not affect the subject-matter of the present invention.

It is of paramount significance, however, that the compensating chamber exhibit a flow resistance great enough to prevent the pressure changes caused in the working chambers 1 by vibrations which are introduced into the engine mount from producing significant relative displacements of the liquid components contained in the compensating opening. This requirement can be easily met based on simple tests or by using one or several compensating chambers which are of a capillary-active narrowness. The embodiment of FIG. 1 has only one capillary opening. It is enclosed by a capillary tube 14 which preferably exhibits a maximum rigidity. It can be made of metal or a hard plastic, for example.

FIG. 2 shows a damping body 6 which is inserted in another embodiment of the compensating opening 5 and consists of particles which are pressed together in a screen cage. They are of a spherical shape and made of metal.

FIG. 3 shows a damping body similar to the embodiment of FIG. 2. However, it is configured as one piece and is made of particles which are bonded or welded to one another, for example, in the form of thin wires.

Figure 1:
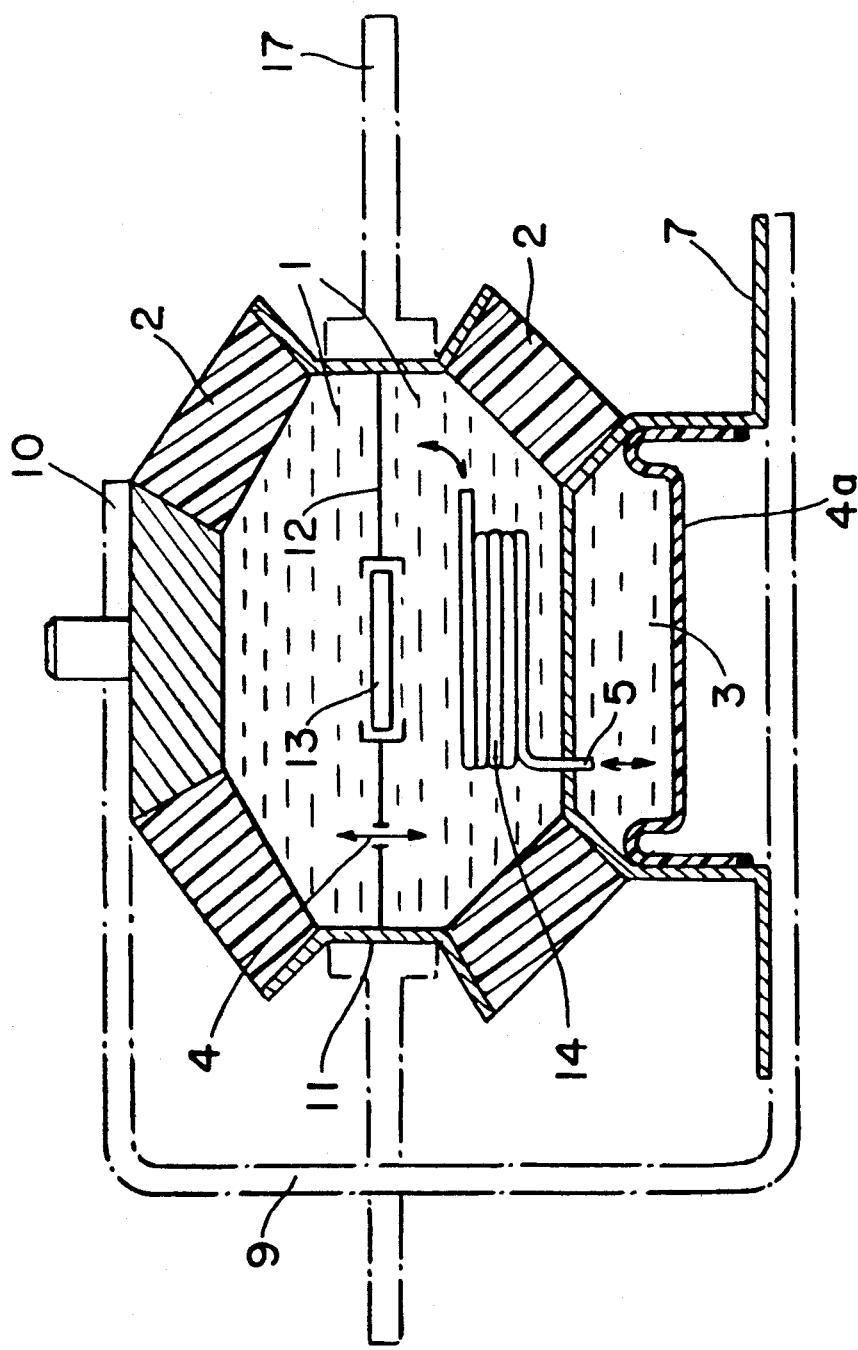

FIG. 4 concerns an embodiment which includes two juxtaposed damping openings in the wall 12. The compensating opening 5 represented in the left portion of the drawing permits liquid to pass in direction of the compensating chamber 3 when certain minimum pressure is exceeded in the working chamber 1. This pressure is defined by the tensile force of the helical spring 15.

A pressure relief valve 8 is provided in the right portion of the drawings; the aforesaid valve is permeable from direction of the compensating chamber 3 toward direction of the working chamber 1 in case a subatmospheric pressure is likely to be generated in the working chamber 1. The helical spring 16 defines the corresponding value.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A hydraulically damped engine mount comprising:
   two separate working chambers which are filled with liquid;
   a resilient wall bounding each of said working chambers at least in a partial area and a rigid wall separating said working chamber, said rigid wall having a damping opening joining said working chambers and a second opening with a disk for controlling the flow of liquid between said working chambers;
   a compensating chamber in addition to the working chambers,
   a flexible and substantially nonelastic wall for enabling the pressureless reception of additional liquid to the compensating chamber;
   the compensating chamber having at least one compensating opening for joining the compensating chamber to at least one working chamber and the compensating opening exhibiting a flow resistance which is substantially greater than that of the damping opening.

2. Engine mount in accordance with claim 1, in which the compensating opening is configured as a capillary opening.

3. Engine mount in accordance with claim 1, in which the compensating opening includes at least one open-pore damping body.

4. Engine mount in accordance with claim 3, in which the damping body is configured as one piece.

5. Engine mount in accordance with claim 3, in which the damping body includes several particles which are pressed together.

6. Engine mount in accordance with claim 5, in which the particles are of one of the group consisting of spherical and fiber-like shapes.

7. Engine mount in accordance with claim 3, in which the damping body is made of one of the group consisting of metallic, artificial and natural materials.

8. Engine mount in accordance with claim 1, in which the compensating opening has a pressure relief valve.

* * * * *